US009434116B2

(12) United States Patent
Masini et al.

(10) Patent No.: US 9,434,116 B2
(45) Date of Patent: Sep. 6, 2016

(54) PROCESS FOR MANUFACTURING COMPOSITE MATERIAL PRODUCTS, AS WELL AS PRODUCTS MANUFACTURED WITH THIS PROCESS

(75) Inventors: Attilio Masini, Monteveglio (IT); Luigi De Sario, Crevalcore (IT)

(73) Assignee: AUTOMOBILE LAMBORGHINI S.P.A., Sant' Agata Bolognese (BO) (IT)

( * ) Notice: Subject to any disclaimer, the term of this patent is extended or adjusted under 35 U.S.C. 154(b) by 0 days.

(21) Appl. No.: 13/980,349

(22) PCT Filed: Feb. 12, 2012

(86) PCT No.: PCT/IB2012/050663
§ 371 (c)(1),
(2), (4) Date: Sep. 11, 2013

(87) PCT Pub. No.: WO2012/114226
PCT Pub. Date: Aug. 30, 2012

(65) Prior Publication Data
US 2013/0341971 A1    Dec. 26, 2013

(30) Foreign Application Priority Data
Feb. 21, 2011   (IT) ................................ MI2011A0253

(51) Int. Cl.
*B29D 99/00*   (2010.01)
*B29C 70/86*   (2006.01)
(Continued)

(52) U.S. Cl.
CPC ............. *B29D 99/001* (2013.01); *B29C 70/86* (2013.01); *B29D 99/0021* (2013.01); *B62D 25/06* (2013.01); *B29L 2001/00* (2013.01); *Y10T 428/24322* (2015.01)

(58) Field of Classification Search
CPC ... B29C 47/00; B29C 70/86; B29D 99/0021; B29D 99/001; B29L 2001/00
USPC ................ 296/210, 191, 154; 264/155, 154; 428/137
IPC ....................................................... B29C 70/86
See application file for complete search history.

(56) References Cited

U.S. PATENT DOCUMENTS 4,119,749 A * 10/1978 Roth et al. ........................ 428/99
4,446,185 A *  5/1984 Waragai .................. B29C 70/68
264/45.3
(Continued)

FOREIGN PATENT DOCUMENTS

DE      101 01 271 A1    8/2002
EP      1 657 042 A1     5/2006
(Continued)

OTHER PUBLICATIONS

International Search Report and Written Opinion of PCT/IB2012/050663 dated Jun. 19, 2012.
(Continued)

*Primary Examiner* — Pinel Romain
(74) *Attorney, Agent, or Firm* — Lucas & Mercanti, LLP (57) ABSTRACT

Process for manufacturing composite material products is disclosed having at least the following operating steps:
  molding at least one plastic material spacer having one or more inserts;
  molding at least one composite material product having at least the spacer; and
  mechanically working at least one of the inserts for forming at least one threaded hole therein.
The present invention also relates to the products manufactured with this process.

10 Claims, 12 Drawing Sheets

(51) Int. Cl.
*B62D 25/06* (2006.01)
*B29L 1/00* (2006.01)

(56) References Cited

U.S. PATENT DOCUMENTS

| | | | | |
|---|---|---|---|---|
| 4,598,008 | A | * | 7/1986 | Vogt et al. .................... 428/117 |
| 5,079,055 | A | | 1/1992 | Doyle |
| 5,108,691 | A | * | 4/1992 | Elliott .......................... 264/554 |
| 6,877,787 | B2 | * | 4/2005 | Ito et al. ......................... 296/70 |
| 7,017,981 | B2 | * | 3/2006 | Strohmayr et al. ........... 296/210 |
| 8,367,183 | B2 | * | 2/2013 | Take et al. .................... 428/117 |
| 9,089,961 | B2 | * | 7/2015 | Fleck ........................ B25G 3/00 |
| 2002/0021027 | A1 | * | 2/2002 | Kralik et al. ................. 296/210 |
| 2004/0164450 | A1 | * | 8/2004 | Mathew ............ B29C 45/14795 264/255 |
| 2011/0272973 | A1 | * | 11/2011 | Petersen et al. .............. 296/210 |
| 2012/0177490 | A1 | * | 7/2012 | Lussier .................. F01D 25/28 415/213.1 |
| 2013/0049406 | A1 | * | 2/2013 | Hasl ........................ 296/203.02 |
| 2013/0088047 | A1 | * | 4/2013 | Lohmann et al. ....... 296/203.01 |

FOREIGN PATENT DOCUMENTS

| | | |
|---|---|---|
| FR | 2 783 196 A1 | 3/2000 |
| FR | 2783196 A1 | 3/2000 |
| JP | 5-253946 A | 10/1993 |

OTHER PUBLICATIONS

Chinese Office Action dated Dec. 2, 2014 issued in Chinese Application No. 201280008725.4; p. 3.

English Translation, Official Action, Russian patent application No. 2013143001 based on PCT/IB2012/050663 (7 pages).

English Translation, Notice OF Reasons For Refusal, Japanese patent application No. 2013554037 (9 pages).

English Translation and Chinese original of the Third Official Action issued for Chinese Patent Application No. 201280008725.4, which was mailed on Dec. 24, 2015 (12 pages).

* cited by examiner

PROCESS FOR MANUFACTURING COMPOSITE MATERIAL PRODUCTS, AS WELL AS PRODUCTS MANUFACTURED WITH THIS PROCESS

CROSS-REFERENCE TO RELATED APPLICATIONS

This application is a 371 of PCT/IB2012/050663, filed Feb. 14, 2012, which claims the benefit of Italian Patent Application No. MI2011A000253,filed Feb. 21, 2011, the contents of each of which are incorporated herein by reference.

FIELD OF THE INVENTION

The present invention relates to a process for manufacturing composite material products, in particular shells and roofs for monocoques of motor vehicles. The present invention also relates to the products manufactured with this process.

BACKGROUND OF THE INVENTION

Known monocoques made of a composite material, in particular carbon fiber, are generally manufactured by fixing to each other by means of adhesives and/or mechanical members, for example bolts, composite material components which are moulded separately. Such known monocoques are characterized both by a high cost, since the whole structure is not intended for the exploitation of the potentialities of the composite material, and by a medium level of repeatability, substantially due to the high use of manual operations within the manufacturing process. As a matter of fact, the monocoques are made of numerous components, all moulded separately by means of a manual stratification, which are then assembled manually or by means of gluing templates. The components are therefore first produced and subsequently assembled, by following the classic production and assembly process typical of the motor vehicle industry. The components are generally obtained by means of moulding processes with fiber carbon substrates pre-impregnated with resin, known as pre-preg, which are layered manually and cured in an autoclave. This process requires long manual workings and expensive materials, furthermore it does not ensure as repeatability comparable with all the other parts of the vehicle. The monocoques produced until now are therefore also not much suitable for the mass production. The manufacturing processes further require very articulated systems which lead, in most cases, to have tens of moulds reserved for producing a single component. Moreover, the products must be disadvantageously worked within few days since the material highly degrades if left at room temperature before the cure cycle, so that such known process can hardly thee sudden production stops and involves a high risk of producing rejects.

The known monocoques are therefore very expensive and difficult to produce in a high mass due to the high number of few repeatable components. The parts are mainly made up of pre-impregnated fibers, which are expensive and require a high deftness. Their manufacturing process is further characterized by a clear separation between production and assembly, the used moulds have a limited life and the production cycle in which they are used provides for the use of a lot of moulds in view of a single manufactured piece.

U.S. Pat. No. 5,079,055 discloses a reinforcement member for composite material products, which member is provided with an insert with a threaded hole. However, during the moulding of the composite material with the reinforcement member, such threaded hole may be disadvantageously filled with resin, since it is open to the outside.

In order to solve this disadvantage, FR 2783196 discloses a spacer provided with an insert with a threaded hole which is closed by one or more plugs. A plug is removed with a mechanical working after the moulding of the composite material. However, this known process is more expensive, since it requires the application and the removal of the plugs from the threaded hole, and further it does not allow a precise arrangement of the threaded hole with respect to the moulded product if the relative position of the inserts with respect to the product is not perfect.

SUMMARY OF THE INVENTION

It is therefore an object of the present invention to provide a process and products which are free from said disadvantages. Said object is achieved with a process and a product, whose main features are disclosed in claims 1 and 13, respectively, while other features are disclosed in the remaining claims.

The process and the system according to the present invention allow not only to pull down the costs, thereby allowing the use of composite material products on a mass production volume, but also to ensure the repeatability required by the production standards.

The process includes a co-curing step, in which at least two components are produced so that a main component acts as a mould for a secondary component. Both components are then cured together by means of intermediate substrates, thus avoiding gluing steps. This process can be obtained by means of a particular modular system which assumes different functions during the production process.

The intermediate substrates further allow to compensate tolerances, if any, between the components, so that the final product has precise shapes and sizes. For this purpose, the main component is preferably moulded between two main moulds with an RTM process, so that both its inner wall and its outer wall have surfaces with precise shapes and sizes.

The present invention also relates to a monocoque comprising a shell which substantially corresponds to the compartment of a motor vehicle and a roof which covers this shell. These two components are preferably manufactured by means of the process and the system according to the present invention. The costs of the process are relatively low thanks to the massive use of production techniques differing from the pre-preg in autoclave, such as the RTM (Resin Transfer Moulding) and braiding processes. Both these processes are based on the laying of dry fibers inside moulds and on the subsequent injection of resin. The braiding process is based on the automatic weaving of the fibers on a mandrel and on the subsequent injection of resin, while the RTM process is based on the deposition of dry fabrics and the subsequent injection of resin. The shaping of the substrates and their subsequent deposition in the moulds can be automated, thus making more repeatable and economic the parts produced with these processes.

The modularity of the moulds involves a reduction not only of the number of moulds but also of the number of moulds per number of pieces: some monocoques produced until now, for example, are produced in a single moulding step. The complexity of the geometries and the number of subsets requires several tenths of moulds for manufacturing a single component. In the process and the system according to the invention, however, there is the opposite situation, in which few moulds produce a high number of parts, exactly thanks the modularity of the system.

A further advantage of the process and the system consists of the combination of the modular moulds, in which the produced parts become a mould for the subsequent ones, and of the massive use of processes less aggressive than the pre-preg, which leads to a life of the moulds expected in 400 pieces for the main moulds and 800 pieces for the secondary moulds, in view of a life of about 150 pieces of the traditional moulds used until now.

The reduction of the equipments costs, thus, involves not only a reduction of the moulds number, but also lower maintenance and regeneration connected to the moulds during their use.

Another advantage of the process and the system consists of the possibility of carrying out several production steps in parallel. The monocoques produced until now in few very complex moulding steps are very exposed to the risk of rejects. A single complex item is certainly more subject to errors and defects than another one made up of higher number of simple and especially unlinked steps. Various stops carried out in parallel allow to handle both possible remakings of some components and possible stops of the production.

Particular spacers allow both to increase the moment of inertia of the resistant sections of the monocoque, thus conferring a high structural rigidity to the latter, and to obtain space for housing metal inserts fur the structural connection with other parts of a motor vehicle. These spacers are preferably arranged between substrates belonging to different sections of the monocoque but they can also be arranged in the middle of the stratification of some components.

The process is advantageously simplified by moulding the inserts in given positions in the spacers, so that these inserts are not moulded between two substrates of the composite material components, thus decreasing the complexity of the working of the substrates. Furthermore, the inserts are worked, for example with threaded holes, at the end of the production process, so as to simplify this process and obtain also a final product worked with precision, since the position of the threaded holes does not depend on the position of the inserts but is determined by taking as an absolute reference the position of the final product. Thus, with this arrangement, possible imprecise arrangements of the inserts in the final product are compensated.

The main component, namely the inner wall of the monocoque shell, is preferably produced with an RTM process, in particular the RTM process according to the Italian patent application MI2010A001072, by means of some main moulds, and houses, in the middle of its stratification, seven spacers preferably provided with metal inserts which are housed inside auxiliary moulds filled with epoxy foam which is cured to assume the final shape of the spacer. These inserts may also include elements made of a composite material, in particular carbon fiber.

Particular spacers to be arranged between the main component and the secondary components, namely between the inner and outer walls of the monocoque shell, can be produced in parallel always with the same process, namely by creating hollow composite material structures which contain the inserts and which are left empty or are filled with epoxy foam.

BRIEF DESCRIPTION OF THE DRAWINGS

Further advantages and features of the process, the spacer and the products according to the present invention will become apparent to those skilled in the art from the following detailed and non-limiting description of an embodiment thereof with reference to the accompanying drawings in which.

DETAILED DESCRIPTION OF THE INVENTION

Figure 1:
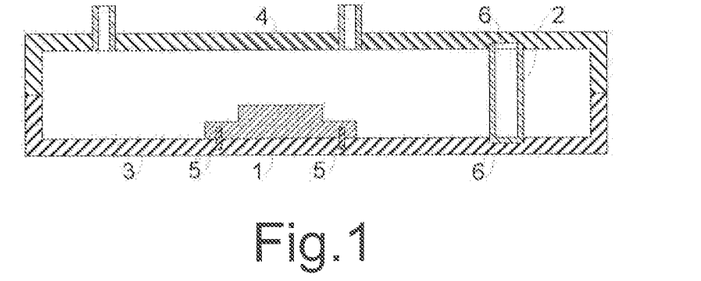
FIG. 1 shows an enlarged section of the auxiliary moulds in a first step of the process.

Referring to FIG. 1, it is seen that in a first step of the process one or more first inserts 1, 2 are arranged in one or more auxiliary moulds 3, 4, in particular in contact with at least one functional surface of these moulds. The first inserts 1, 2 are preferably made of metal, particularly aluminum or light alloy, of a composite material, in particular carbon fiber, or of a combination of these materials, for example by moulding in a preliminary step a metal insert between two or more substrates of fibers. The auxiliary moulds 3, 4 are preferably made of a composite material, in particular carbon fiber. The auxiliary moulds 3 and/or 4 are preferably provided with protrusions 5 and/or seats 6 to maintain the first inserts 1, 2 in a given position. To this end, the first inserts 1, 2 have shapes complementary with said protrusions 5 and/or seats 6. In particular, protrusions 5 are pins adapted to be inserted into corresponding holes formed in a first insert 1, preferably with a coupling with friction, so that insert 1 remains in position even if the auxiliary moulds 3, 4 are reversed. Also insert 2 can be arranged in seat 6 with a coupling with friction.

Figure 2:
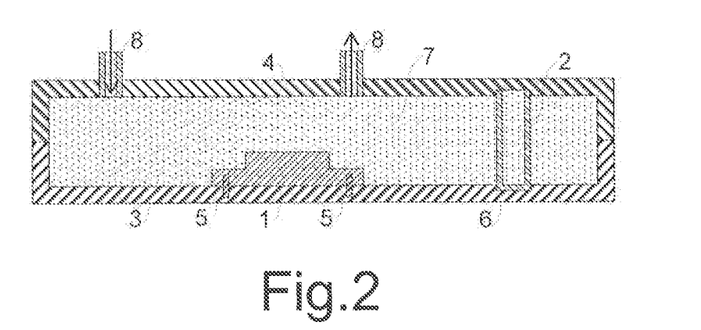
FIG. 2 shows an enlarged section of the auxiliary moulds of FIG. 1 in a second step of the process.

Referring to FIG. 2, it is seen that in a second step of the process, plastic material 7 is injected through inlets and outlets 8 into the auxiliary moulds 3, 4, after which it is cured by heating the auxiliary moulds 3, 4 in an oven at a temperature between 80° C. and 150° C. The auxiliary moulds 3, 4 are preferably rotated during their heating to evenly distribute the plastic material 7 in them. The plastic material 7 is preferably a material, in particular epoxy foam, which expands during the cure.

Figure 3:
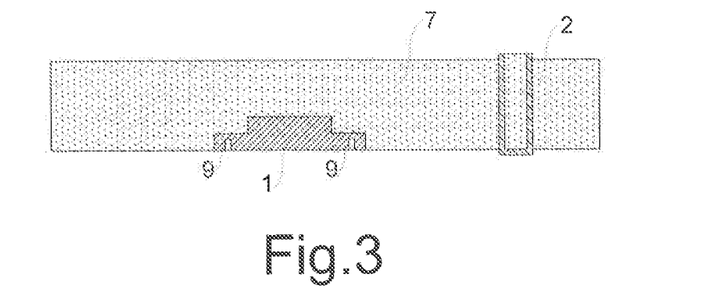
FIG. 3 shows a spacer obtained by means of the auxiliary moulds of FIG. 1.

Referring to FIG. 3, it is seen that, after the epoxy foam has cured, the auxiliary moulds 3, 4 are cooled to a temperature below 50° C., opened and separated from product 7, which forms in particular a first spacer for composite material products. Spacer 7 comprises thus the cured epoxy foam which incorporates at least partially the first inserts 1, 2, which may protrude from the first spacer 7 or have a surface visible outside of the first spacer 7. Holes 9 of insert 1 for pins 5 are then open to the outside.

Figure 4:
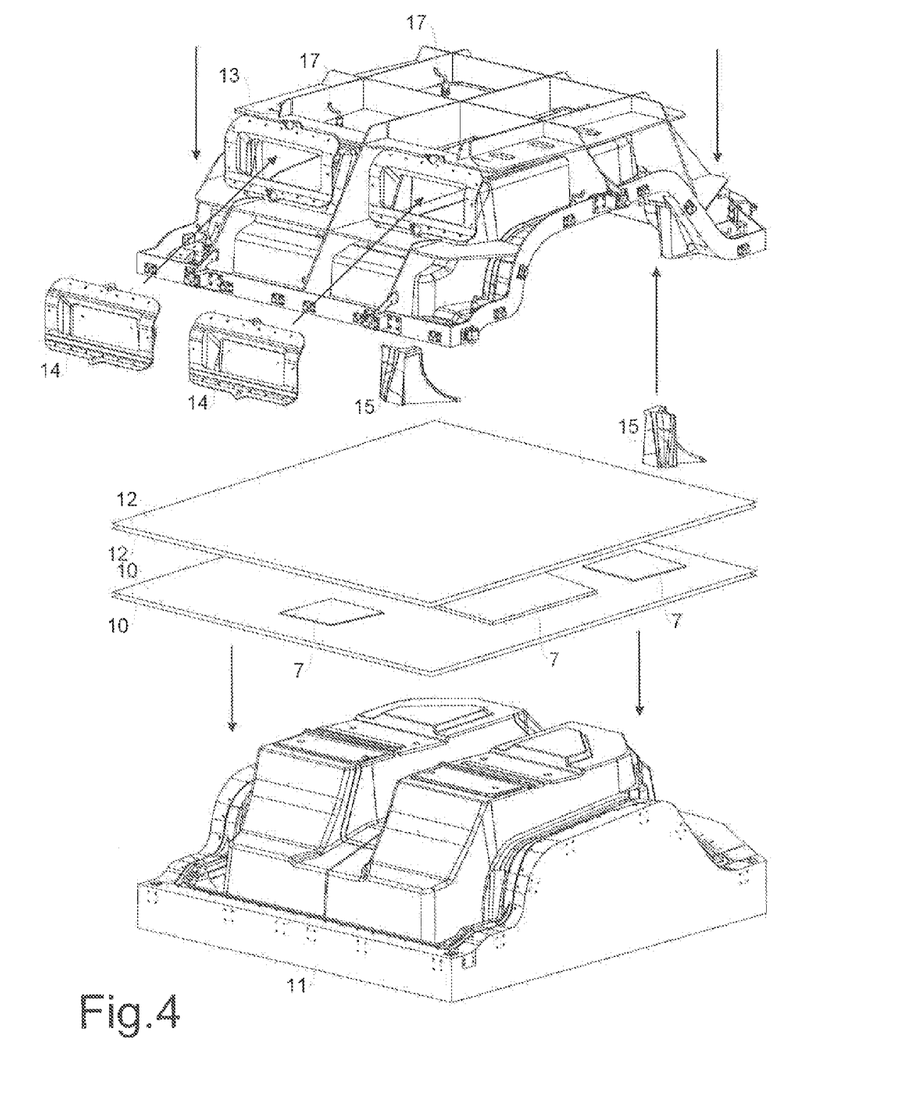
FIG. 4 shows a perspective view of the main moulds in a third step of the process.
Figure 5:
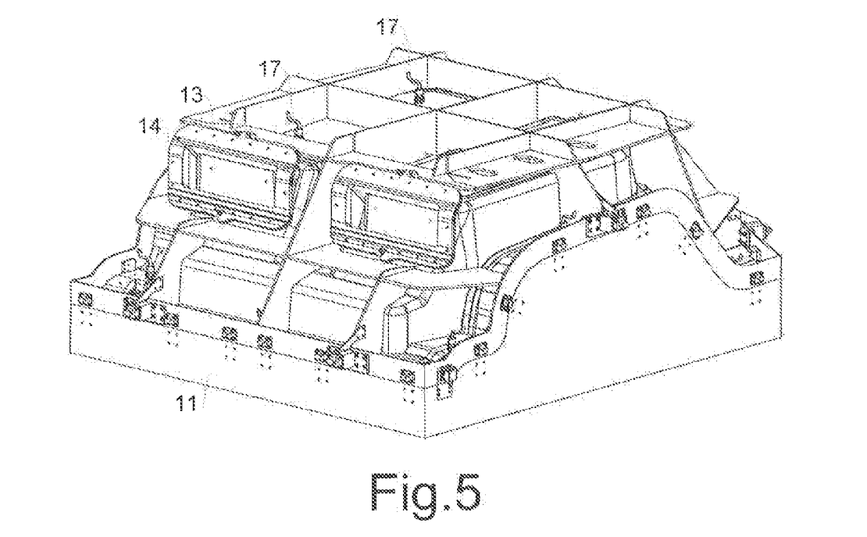
FIG. 5 shows a perspective view of the main moulds of FIG. 4 in a fourth step of the process.
Figure 6:
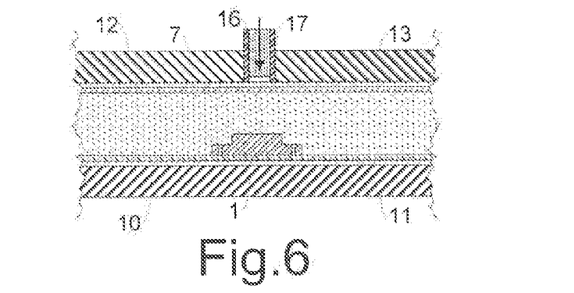
FIG. 6 shows an enlarged and partial section of the main moulds of FIG. 5.

Referring to FIGS. 4 to 6, it is seen that in a third step of the process one or more, in particular two first main substrates 10 of fibers, in particular carbon fibers, preferably dry, namely coupled with a quantity of resin from 0 to 10%, preferably 5%, by weight, are arranged on at least one functional surface of a first main mould 11. One or more first spacers, in particular one or more first spacers 7 with one or more first inserts 1, 2 manufactured as described above, can be arranged in contact with the first main substrates 10 and/or with the first main mould 11, One or more, in particular two second main substrates 12 of fibers, in particular carbon fibers, preferably dry, are then arranged on the first main substrates 10 and/or on the first main mould 11 and/or on the first spacers 7. At least one portion of the first spacers 7 is preferably arranged between the first main substrates 10 and the second main substrates 12. At least one second main mould 13 is aligned with the first main mould 11, for example by means of complementary pins and holes, and is fastened to the first main mould 11, for example by means of mechanical fastening devices, in particular toggle latches and/or screws, so that the first main substrates 10, the first spacers 7 and the second main substrates 12 are arranged between the functional surfaces of the main moulds 11, 13. The main moulds, in particular the second main mould 13, can be provided with movable walls 14 and/or blocks 15 to form undercut portions and/or deep cavities, respectively, in a moulded product. In FIG. 4 the main substrates 10, 12 are shown for simplicity with a rectangular shape, however each main substrate 10, 12 can be divided into a plurality of portions having different shapes, sizes, thicknesses and/or wefts, which portions are preferably cut by numerical control machines. Also the first spacers 7 may have shapes and/or dimensions differing from those shown in FIG. 4.

In a fourth operating step of the process, resin 16 for composite materials is injected at a pressure between 0.5 bar and 3.5 bar, in particular between 1.5 and 2.5 bar, through one or more inlets 17 between the main moulds 11, 13, preferably evacuated to a pressure lower than 0.5 bar, in particular comprised between 0.001 and 0.02 bar, through one or more outlets, so as to impregnate the main substrates 10, 12 with resin 16. Resin 16 is then cured by heating the main moulds 11, 13 in an oven to mould at least one main component. The main moulds 11 and/or 13 are preferably heated, in particular at a temperature comprised between 25° C. and 70° C., before injecting resin 16 in them. The main moulds 11 and/or 13 are preferably made of a composite material, in particular they are made up by a plurality of substrates of fibers, in particular carbon fibers, pre-impregnated with a resin which is cured in a preliminary step to achieve the finished moulds 11 and/or 13. The first main mould 11 has a mainly convex functional surface, while the second main mould 13 has a mainly concave functional surface. In particular, the first main mould 11 has a functional surface with two convex portions separated by a concave canal, while the second main mould 13 has a functional surface with two concave portions separated by a convex canal. The cross sections of the convex portions and/or of the concave canal of the first main mould 11 and/or of the concave portions and/or of the convex canal of the second main mould 13 are substantially rectangular or substantially trapezoidal.

Figure 7:
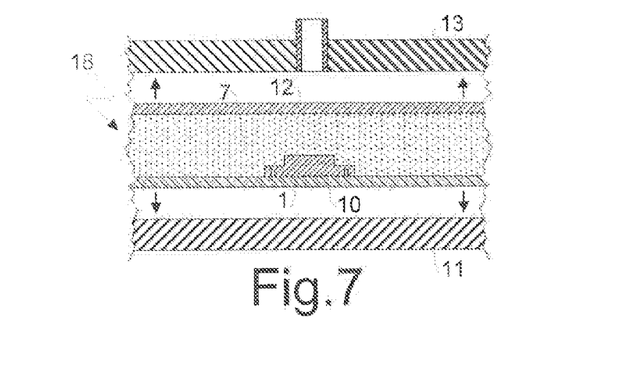
FIG. 7 shows the section of FIG. 6 in a fifth step of the process.
Figure 8:
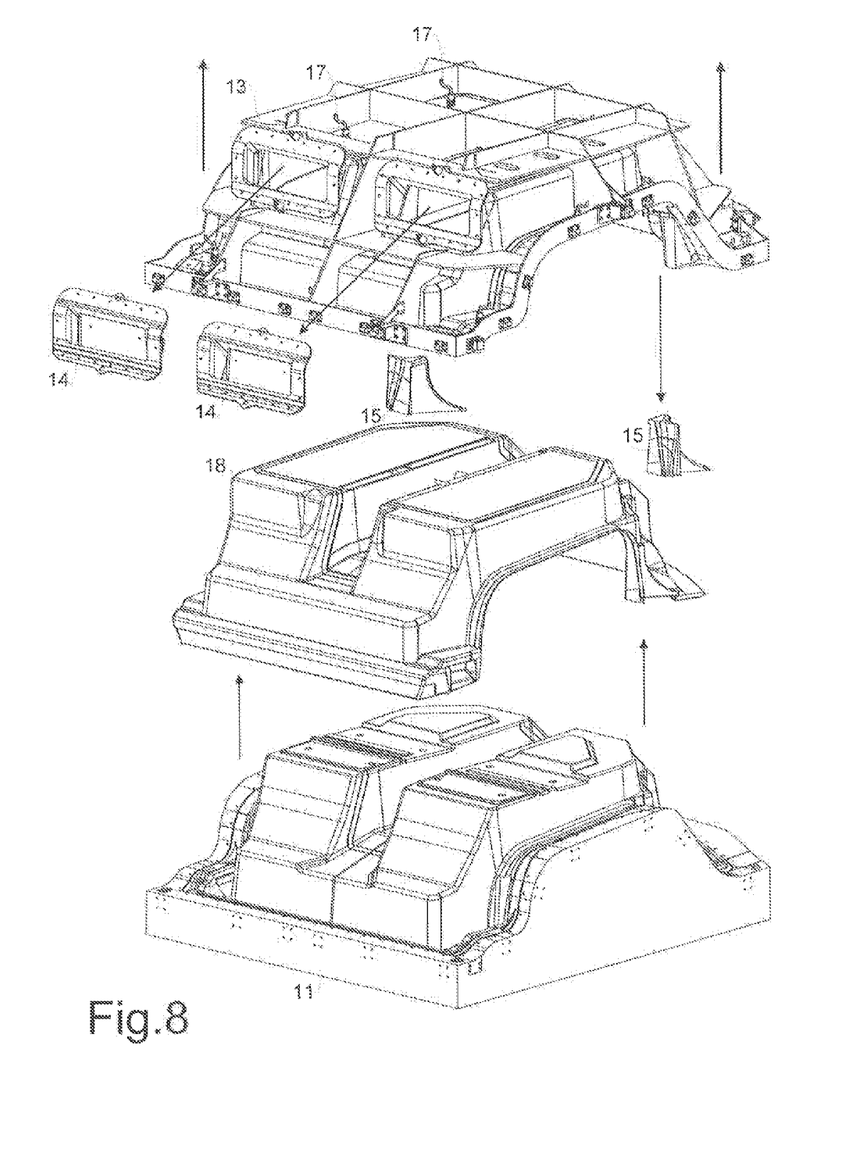
FIG. 8 shows a perspective view of the main moulds of FIG. 4 in the filth step of the process.

Referring to FIGS. 7 and 8, it is seen that in a fifth step of the process the main moulds 11, 13 are cooled, opened at a temperature between 40° C. and 70° C., then separated from the main component 18 comprising the main substrates which are cured with resin 16 to form at least one inner wall 10 and/or one outer wall 12, respectively, of the main component 18 with at least one first spacer 7 arranged between these walls 10, 12. In an alternative step of the process, the main component 18 remains on the first main mould 11, so that the inner wall 10 remains in contact with the functional surface of the first main mould 11.

Figure 9:
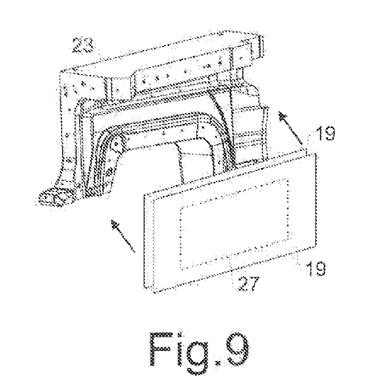
FIGS. 9 to 12 show perspective views of the secondary moulds in a sixth step of the process.
Figure 10:
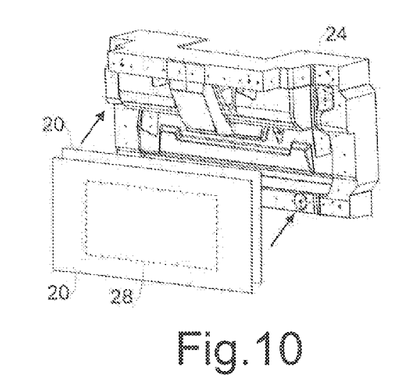
Figure 11:
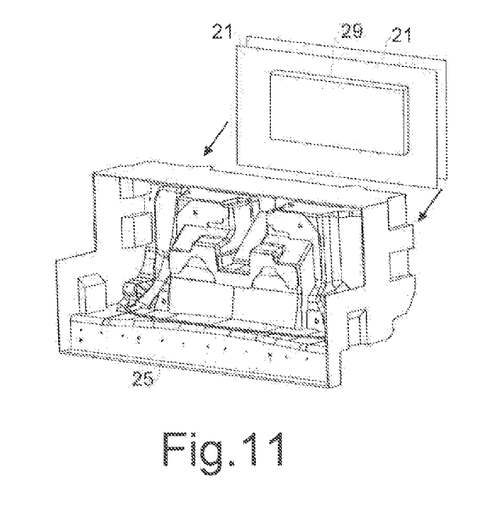
Figure 12:
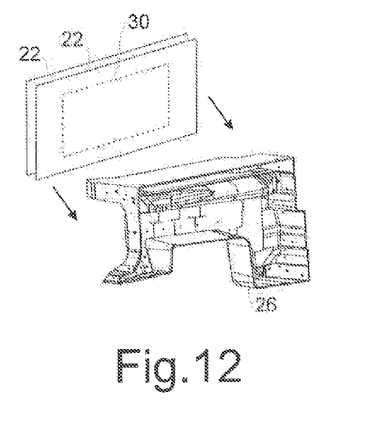
Figure 13:
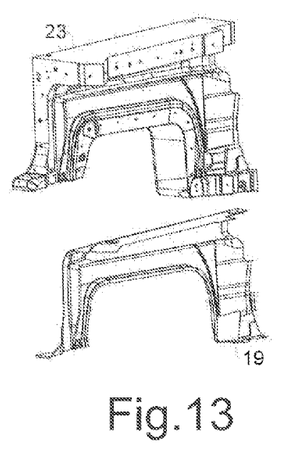
FIGS. 13 to 16 show perspective views of the secondary moulds of FIGS. 9 to 12 in a seventh step of the process.
Figure 14:
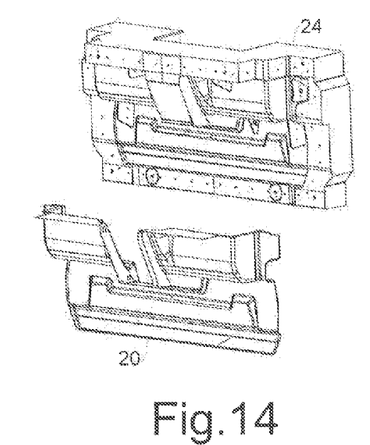
Figure 15:
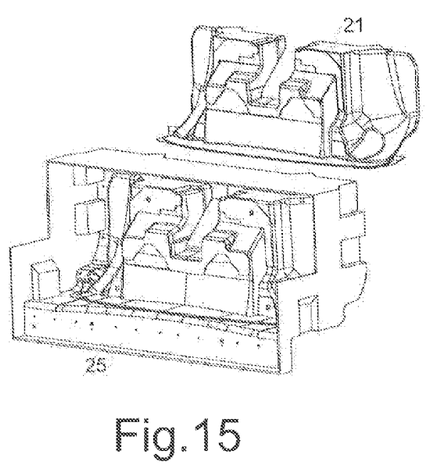
Figure 16:
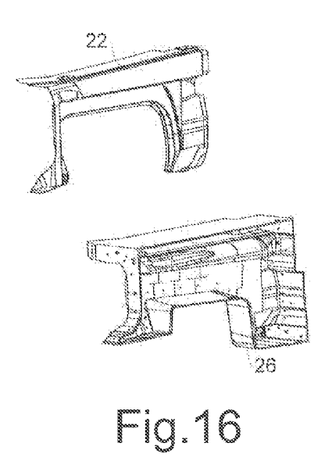

Referring to FIGS. 9 to 12, it is seen that in a sixth step of the process, which can carried out before, during or after the previous steps, one or more, in particular two secondary substrates 19, 20, 21, 22 of fibers, in particular carbon fibers, preferably pre-impregnated (pre-preg), namely coupled with a quantity of resin higher than 10% by weight, are arranged on at least one functional surface of at least one first secondary mould 23, of at least one second secondary mould 24, of at least one third secondary mould 25 and of at least one fourth secondary mould 26, respectively. One or more second inserts 27, 28, 29, 30, preferably of metal, in particular plates made of aluminum or light alloy, and/or of a composite material, can be arranged between two secondary substrates or between a secondary substrate and a secondary mould or outside of the secondary substrates, which are then arranged between a second insert and a secondary mould. In FIGS. 9 and 12 the second inserts 27, 30 are arranged between the two secondary substrates 19 or 22, respectively, while in FIGS. 10 and 11 the second inserts 28, 29 are arranged between the secondary substrates 20, 21 and the second secondary mould 24 or the third secondary mould 25, respectively. In FIGS. 9 to 12 the secondary substrates 19, 20, 21, 22 are shown for simplicity with a rectangular shape, however each secondary substrate 19, 20, 21, 22 can be divided into a plurality of portions having different shapes, sizes, thicknesses and/or wefts. Also the second inserts 27, 28, 29, 30 may have shapes and/or dimensions differing from those shown in FIGS. 9 to 12.

The secondary moulds 23, 24, 25, 26 with the secondary substrates 19, 20, 21, 22 and the second inserts 27 28, 29, 30 are inserted into vacuum bags, heated to a temperature higher than 120° C. and arranged in an autoclave at a pressure higher than 5 bar, so that the secondary substrates 19, 20, 21, 22 and the second inserts 27, 28, 29, 30 are pressed on the secondary moulds 23, 24, 25, 26 while the resin of the secondary substrates 19, 20, 21, 22 is cured.

Referring to FIGS. 13 to 16, it is seen that in a seventh step of the process the secondary substrates 19, 20, 21, 22, after the resin has cured, form secondary components 19, 20, 21, 22 having at least one surface corresponding to at least one functional surface of the secondary moulds 23, 24, 25, 26. The secondary components 19, 20, 21, 22 can be separated from the secondary moulds 23, 24, 25, 26 or left on them. The secondary moulds 23, 24, 25, 26 have a mainly concave functional surface.

Figure 17:
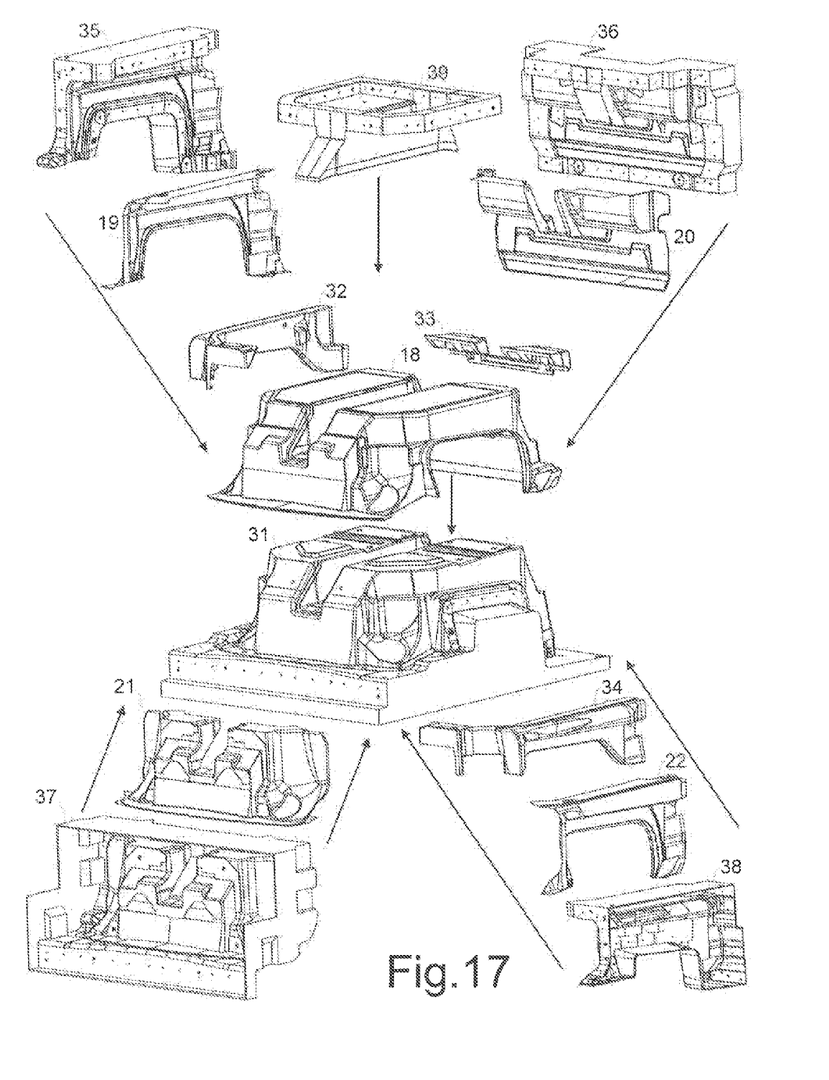
FIG. 17 shows a perspective view of the moulds and of the components in an eighth step of the process.

Referring to FIG. 17, it is seen that in an eighth step of the process the main component 18 is arranged on at least one further first main mould 31 having at least one functional surface substantially equal to a functional surface of the first main mould 11, or, alternatively, the main component 18 is left on the first main mould 11. One or more, in particular three seconds spacers 32, 33, 34, preferably covered by at least one adhesive layer, are arranged on the main component 18. At least one adhesive layer is preferably applied on the portions of the main component 18 not covered by the second spacers 32, 33, 34, after which one or more, in particular two intermediate substrates (not shown in the figure) of fibers, in particular carbon fibers, pre-impregnated with a resin (pre-preg), are arranged on the second spacers 32, 33, 34 and/or on the main component 18 arranged on the first main mould 11 or 31.

During the deposition of the intermediate substrates on the main component 18 and/or on the second spacers 32, 33, 34, the intermediate substrates can be covered by at least one anti-adhesive sheet and the secondary components 19, 20, 21, 22 can be placed temporarily on the intermediate substrates to verify the correct position of the second spacers 32, 33, 34, preferably by arranging the secondary moulds 23, 24, 25, 26 on the secondary components 19, 20, 21, 22, after which the secondary components 19, 20, 21, 22 and the anti-adhesive sheet are removed.

The intermediate substrates are then pressed on the main component 18 by means of a vacuum bag, after which at least one adhesive layer is preferably arranged on the intermediate substrates. The secondary components 19, 20, 21, 22 are then arranged on the intermediate substrates and/or on the second spacers 32, 33, 34 and/or on the main component 18 by means of further secondary moulds 35, 36, 37, 38 that have at least one functional surface substantially equal to a functional surface of the secondary moulds 23, 24, 25, 26, respectively. As an alternative to the further secondary moulds 35, 36, 37, 38, the secondary components 19, 20, 21, 22 are left on the secondary moulds 23, 24, 25, 26.

The main moulds 11, 13 and/or 31 and the secondary moulds 23, 24, 25, 26 and/or 35, 36, 37, 38 are suitably provided with surfaces with shapes and/or elements, for example pins and holes, for carrying out a mechanical coupling with corresponding shapes and/or elements, for example holes and pins, of at least one main mould 11, 13, 31, and/or of at least one secondary mould 23, 24, 25, 26, 35, 36, 37, 38 and/or of at least one further secondary mould 39 having a functional surface substantially equal to at least one portion of a functional surface of the second main mould 13.

Figure 18:
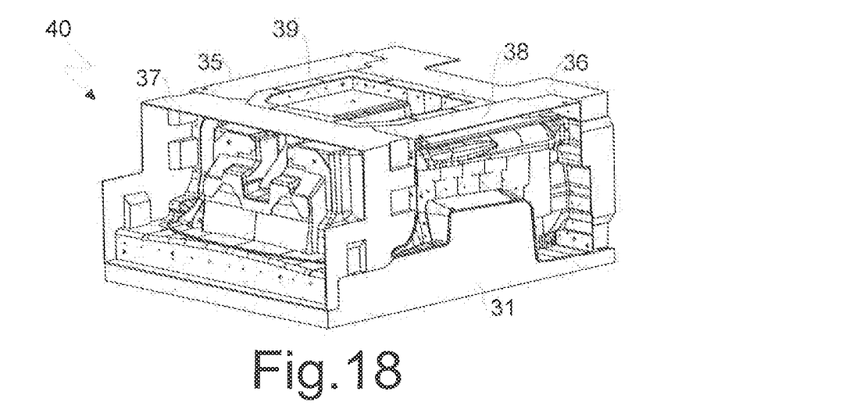
FIG. 18 shows a perspective view of the moulds in a ninth step of the process.

Referring to FIG. 18, it is seen that in a ninth step of the process the first main moulds 11 and/or 31 and the secondary moulds 23, 24, 25, 26, 35, 36, 37, 38 and/or 39 are fastened to each other with mechanical fastening devices, in particular toggle latches and/or screws, to form a modular moulding assembly 40. The first main moulds 11 and/or 31 are preferably mounted on a carriage (not shown in the figure) which is equipped with a locking system which allows a mutual movement between mould and carriage, so as to be able to easily move the moulding assembly 40.

Figure 19:
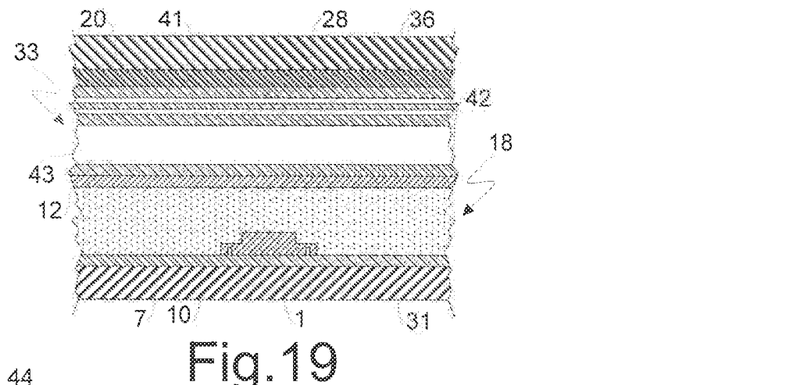
FIG. 19 shows a enlarged and partial section of the moulds of FIG. 18.

Referring to FIG. 19, it is seen that the main component 18 and the secondary component 20 provided with the second insert 28 are arranged between a first main mould, for example the further first main mould 31, and a secondary mould, for example the further second secondary mould 36.

The second spacer 33 is arranged between the main component 18 and the secondary component 20, while the intermediate substrates 41 are arranged between the second spacer 33 and the secondary component 20. The second spacers 32, 33 and/or 34 are preferably made of a composite material, in particular carbon fiber preferably dry, and are moulded by means of an RTM or braiding process in a preliminary step so as to form a hollow body 42 having a cavity 43 which can be left empty or filled with plastic material, in particular epoxy foam. The moulding assembly 40 is then heated, in particular in an oven to at least 130° C. and/or for at least 3 hours, so as to cure the resin of the intermediate substrates 41, which form after the cure a single body with the main component 18, with the secondary components 19, 20, 21, 22 and/or with the second spacers 32, 33, 34. During the cure of the resin of the intermediate substrates 41 in the moulding assembly 40, a further main component can be moulded by means of the main moulds 11, 13 and/or one or more further secondary components can be moulded by means of the secondary moulds 23, 24, 25, 26.

Figure 20:
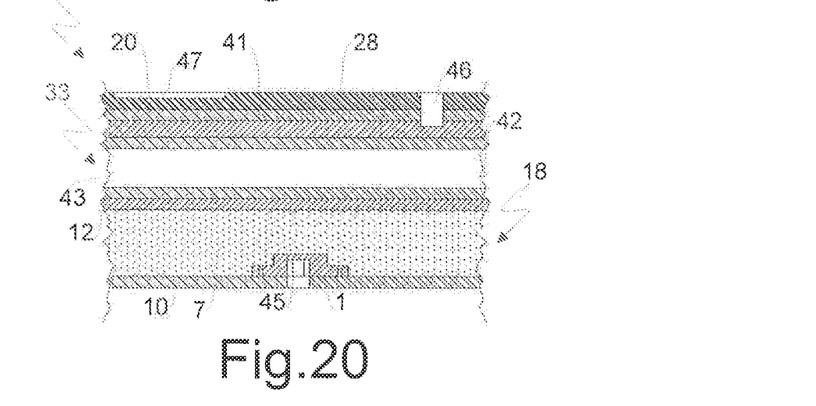
FIG. 20 shows the section of FIG. 19 in a tenth step of the process.
Figure 21:
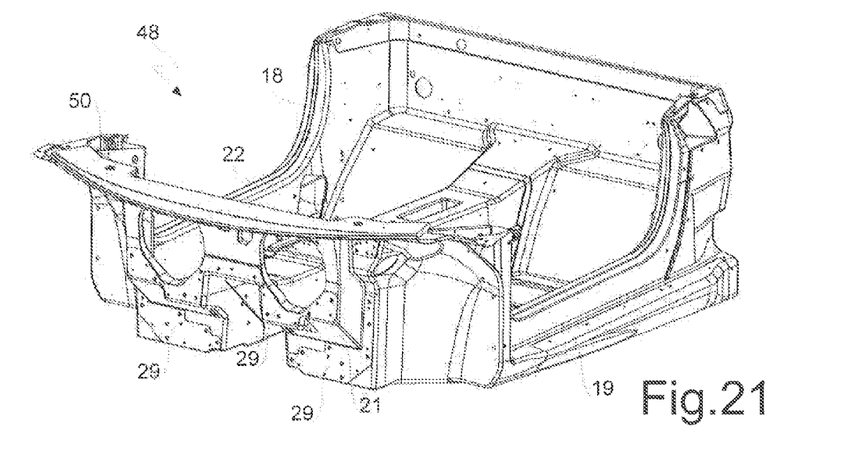
FIG. 21 shows a perspective view of a shell manufactured by means of the process.
Figure 22:
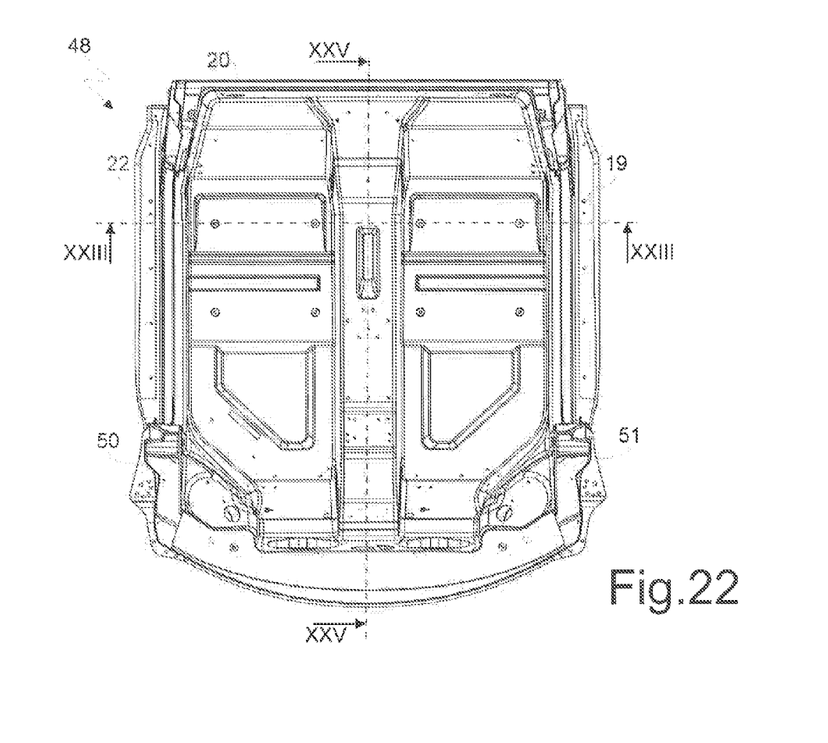
FIG. 22 shows a top view of the shell of FIG. 21.
Figure 23:
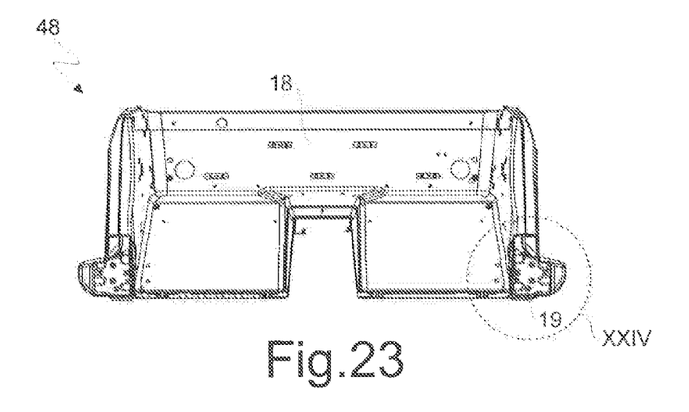
FIG. 23 shows section XXIII-XXIII of FIG. 22.
Figure 24:
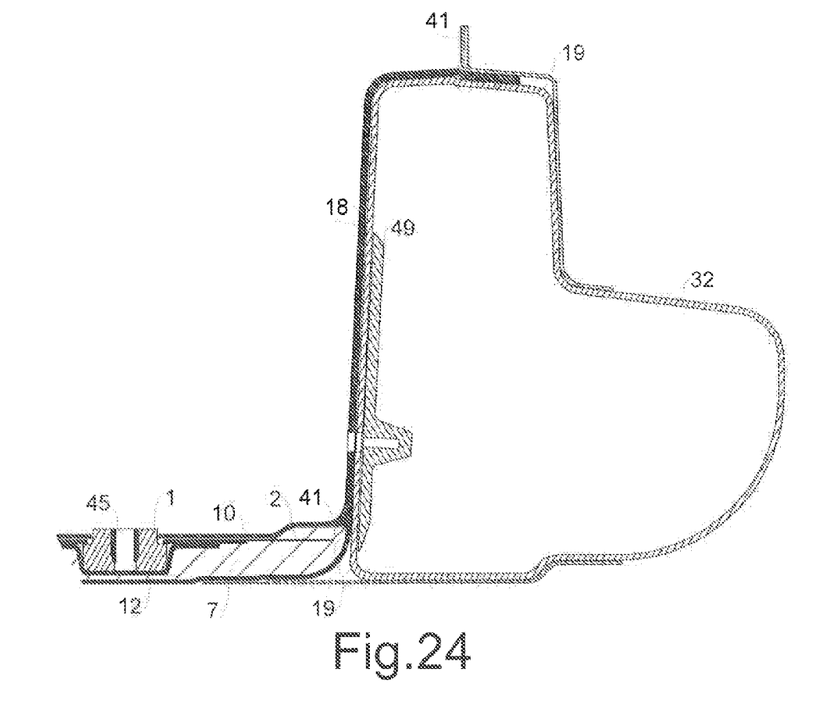
FIG. 24 shows detail XXIV of FIG. 23.
Figure 25:
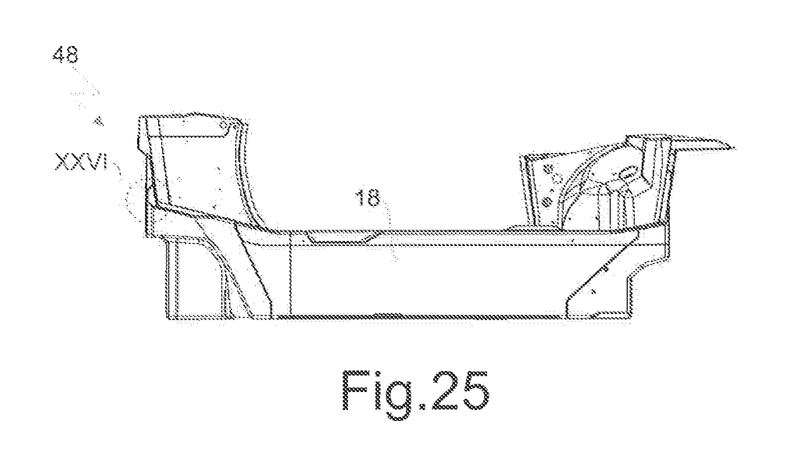
FIG. 25 shows section XXV-XXV of FIG. 22.
Figure 26:
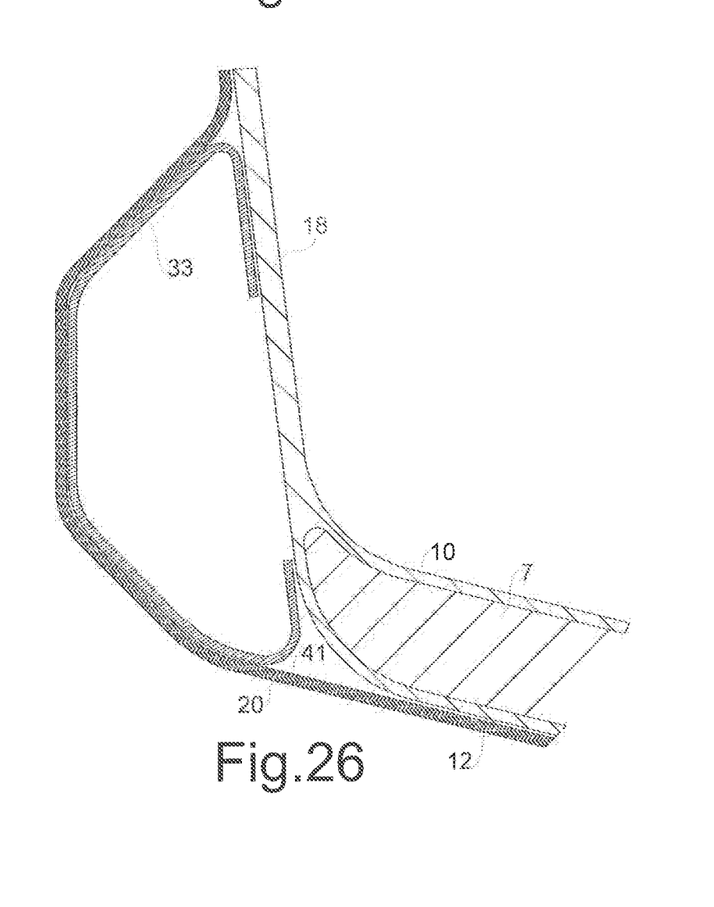
FIG. 26 shows detail XXVI of FIG. 25.

Referring to FIG. 20, it is seen that in a tenth step of the process the moulding assembly 40 is opened and the final product 44 comprising the main component 18 joined to the secondary components 19, 20, 21, 22 by means of the cured intermediate substrates 41, is separated from the main mould 31 and from the secondary moulds 35, 36, 37, 38, 39. The final product 44 is then placed on a support and worked mechanically, preferably by numerical control tools on five axes, to form threaded holes 45 and/or non-threaded holes 46 and/or recesses 47 and/or openings in the final product 44 and in particular in the inserts included in the final product 44, for example in the first insert 1 and in the second insert 28, so as to fasten elements and/or structures to the final product 44. The metal inserts having at least one surface facing outwards, such as the second insert 28, can also be refaced to obtain reference surfaces with precise dimensions and positions.

Referring to FIGS. 21 to 26, it is seen that a shell 48 of a monocoque can comprise said final product 44, namely it can be made by means of the process and/or the moulds according to the present invention. Shell 48 is then provided with at least one inner structure comprising the main component 18, which inner structure is joined to an outer structure comprising the secondary components 19, 20, 21, 22. The lower side portions of shell 48, corresponding to the door sills of the monocoque, comprise the second spacers 32, 34, which preferably have a substantially tubular shape and/or are hollow and/or are made with the braiding technique. At least one insert 49 can be arranged in the second spacers 32, 34. The lower rear portion of shell 48, corresponding to the bench behind the seats in the monocoque, comprises the second spacer 33, which is preferably hollow and/or made with an RTM process. The upper front portion of shell 48, corresponding to the base of the windscreen of the monocoque, comprises at least one pair of substantially wedge-shaped cavities 50, 51, which are obtained by means of blocks 15 of the second main mould 13.

Figure 27:
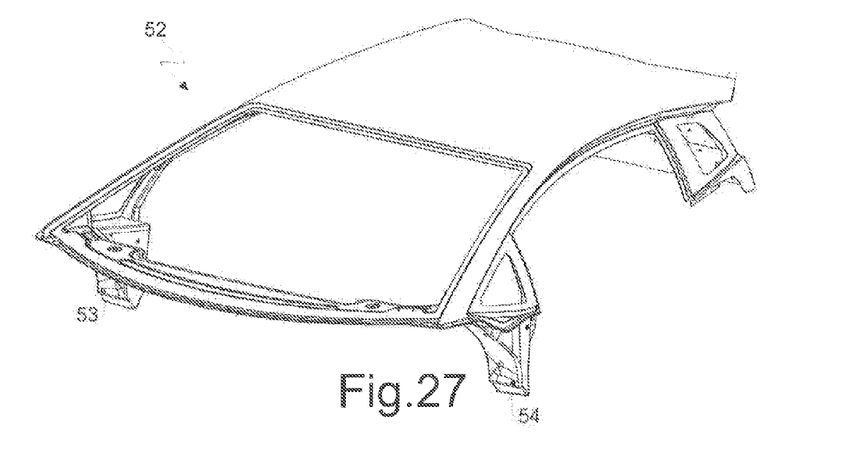
FIG. 27 shows a perspective view of a roof manufactured by means of the process.
Figure 28:
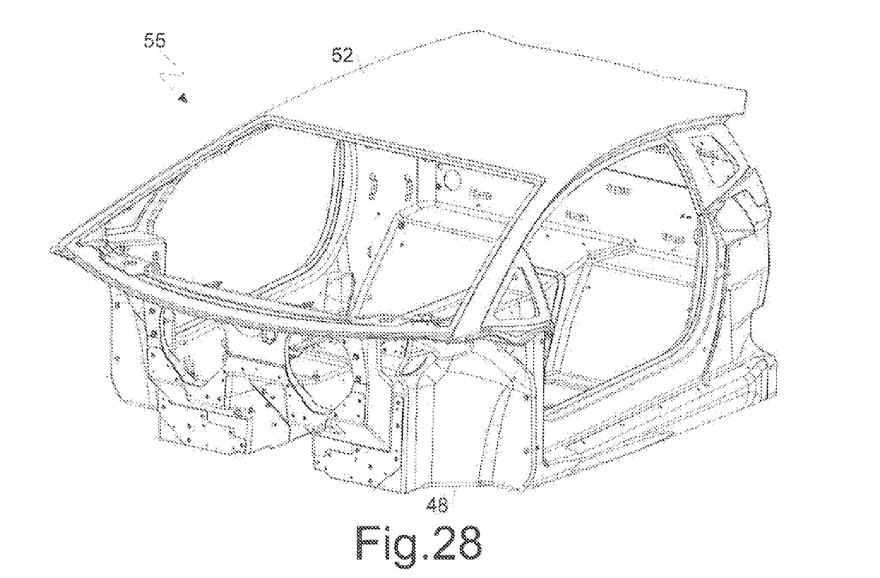
FIG. 28 shows a monocoque comprising the shell of FIG. 21 and the roof of FIG. 27.

Referring to FIGS. 27 and 28, it is seen that a roof 52 of a monocoque can comprise said final product 44, namely it can be made by means of the process and/or the moulds according to the present invention. Roof 52 has at least one pair of projections 53, 54 which protrude downwardly below the frame for a windshield and have a shape substantially complementary to the shape of cavities 50, 51, namely substantially wedge-shaped, so that in a final assembly step roof 52 can be fixed on shell 48 by fixing projections 53, 54 in cavities 50, 51, preferably by means of adhesive substances, to form a monocoque 55. Roof 52 may be fixed to shell 48 also by means of mechanical fastening elements.

Any variants and/or additions may be made by those skilled in the art to the embodiment of the invention described and illustrated herein while remaining within the scope of the following claims. In particular, further embodiments of the invention may comprise the technical features of one of the following claims with the addition of one or more technical features, taken individually or in any mutual combination, described in the text and/or illustrated in the drawings.

The invention claimed is:

1. Process for manufacturing composite material products comprising:
    molding at least one plastic material spacer comprising one or more inserts;
    molding at least one composite material product comprising at least said spacer; and
    mechanically working at least one of the inserts to form at least one threaded hole therein after the molding of the at least one composite material product;
    wherein the inserts are molded with the spacer in one or more auxuliary molds, and
    wherein said auxuliary molds are provided with protrusions or seats for keeping the inserts in a given position.

2. Process according to claim 1 wherein during the molding of the spacer the inserts contact at least one functional surface of the auxiliary molds.

3. Process according to claim 1, wherein during the molding of the spacer the auxiliary molds are heated for curing the plastic material and are rotated during their heating to evenly distribute the plastic material in the auxiliary molds.

4. Process according to claim 1, wherein the inserts are kept by friction in the given position on the protrusions or in the seats.

5. Process according to claim 1, wherein said protrusions are pins suitable for being inserted into corresponding holes made in an insert.

6. Process according to claim 1, wherein the insert provided with the threaded hole is included in the composite material product.

7. Process according to claim 1, wherein a wall of the composite material product covers the insert provided with the threaded hole.

8. Process according to claim 7, wherein said wall of the composite material product is perforated during said mechanical working of the insert for forming the threaded hole therein, so that the resulting hole made in the wall of the composite material product is aligned with and has the same diameter of the threaded hole of the insert.

9. Process according to claim 1, wherein said plastic material is a material which expands during the cure.

10. Process according to claim 9, wherein said plastic material is epoxy foam.

* * * * *

UNITED STATES PATENT AND TRADEMARK OFFICE
CERTIFICATE OF CORRECTION

PATENT NO. : 9,434,116 B2
APPLICATION NO. : 13/980349
DATED : September 6, 2016
INVENTOR(S) : Attilio Masini et al.

Page 1 of 1

It is certified that error appears in the above-identified patent and that said Letters Patent is hereby corrected as shown below:

On the title page, item [22]:

Please correct the PCT filing date to "Feb. 14, 2012", instead of "Feb. 12, 2012" as follows:

--(22) PCT Filed:    Feb. 14, 2012--

Signed and Sealed this
Fifteenth Day of November, 2016

Michelle K. Lee
*Director of the United States Patent and Trademark Office*